United States Patent Office 3,156,675
Patented Nov. 10, 1964

3,156,675
PROCESS FOR THE POLYMERIZATION OF COMPOUNDS CONTAINING OLEFINIC BONDS
Werner Ehmann and Karl-Heinz Kahrs, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 8, 1961, Ser. No. 129,959
Claims priority, application Germany, Aug. 20, 1960, F 31,927
6 Claims. (Cl. 260—87.3)

The present invention relates to a process for the polymerization of compounds containing olefinic bonds.

It is known (confer British patent specification 578,992) to copolymerize ethylene with other monomers, such as vinyl esters, acrylic and methacrylic esters, vinyl chloride, maleic anhydride, vinyl carbazole, etc. at temperatures within the range of 50° to 130° C. and under pressures above 500 atmospheres gage. As catalysts there may be used, for example, oxygen, peroxide or α,α-azobutyric acid nitrile.

It is apparent that such extreme reaction conditions as required for carrying out the copolymerization, especially the high temperatures, constitute a considerable disadvantage in commercial manufacture. A process which would render possible the preparation of copolymers of ethylene at low temperatures and under slightly elevated pressures would, therefore, constitute a considerable advance in the art.

It is, furthermore, known that also propylene and isobutylene can be copolymerized with other unsaturated compounds, such as vinyl esters, acrylic esters and methacrylic esters, as well as vinyl chloride, vinyl carbazole etc. However, also for these copolymerizations elevated temperatures and pressures are required. According to British patent specification 578,992 for the manufacture of copolymers of propylene and other unsaturated compounds, for example, a temperature of at least 85° is required, and according to U.S. Patent 2,421,971 there is required for the manufacture of copolymers of isobutylene and vinyl esters a temperature of at least 60° C. and an elevated pressure.

Now we have found that it is possible to prepare copolymers of olefins having 2 to 4 carbon atoms, preferably of ethylene, propylene and isobutylene with other copolymerizable compounds, preferably vinyl esters, acrylic and methacrylic esters, vinyl chloride, maleic anhydride, vinyl carbazole etc. under a pressure of less than 70 atmospheres gage and at temperatures within the range of −80° C. to +60° C., preferably within the range of −20° C. to +30° C., when there is used as catalyst a mixture comprising an alumino-organic compound of the general formula

wherein x and y represent an alkyl radical having 1 to 8 carbon atoms, an aryl radical, a cycloalkyl radical or hydrogen, and z represents an alkyl radical, an aryl radical or a cycloalkyl radical, with a compound containing at least one peroxide group.

As alumino-organic compounds there are preferably used aluminum trialkyl compounds in which the alkyl radicals contain 1 to 8 carbon atoms. As aryl radical there is preferably used the phenyl radical, and as cycloalkyl radical the cyclohexyl radical.

As vinyl esters which may be used for the process according to the invention, there are mentioned vinyl acetate, vinyl propionate, vinyl butyrate, vinyl stearate, vinyl benzoate.

As acrylates which may be used in the process of the invention there are cited methyl acrylate, ethyl acrylate, propyl acrylate, butyl acrylate, ethyl hexyl acrylate.

As methacrylates that can be incorporated by poylmerization according to the present invention there are mentioned methyl methacrylate and ethyl methacrylate.

As compounds containing at least one peroxide group there may be used, for example, dibenzoyl peroxide, diacetyl peroxide, dilauroyl peroxide, di-tertiary-butyl peroxide, acetone peroxide, cumene hydroperoxide, di-isopropyl percarbonate, etc.

There are generally used 0.5 to 2% by weight of the combined catalyst, calculated on the comonomer, while there may also be used a surplus or a deficiency of the above-defined proportions by weight; there may, for example, be applied a deficiency in the case of monomers which polymerize easily in substance, while a surplus may be applied when plenty of diluents are used.

The molecular weight of the polymer can, of course, be influenced in known manner by the amount of catalyst applied.

The proportion by weight aluminum compound:peroxide is within the range of 100:1 to 100:50, preferably 100:2 to 100:10.

Copolymers of the said olefins having a content of basic molecules of hydrocarbons of up to 20% can be prepared with special advantage.

In the copolymerization of ethylene, the pressure is suitably chosen within the range of 10 to 80 atmospheres gage, preferably 25 to 60 atmospheres gage. The height of pressure influences both the composition of the copolymer and the reaction velocity. In the copolymerization of propylene, 10 to 20 atmospheres gage are generally sufficient. Isobutylene can be polymerized under normal pressure.

Practically no polymerization sets in when using, instead of the catalyst mixture according to the invention, only the respective amount of peroxide under otherwise equal reaction conditions. When using the aluminoorganic compound alone, there are formed traces of polymer which are the smaller the purer the aluminum compound.

The special advantage of this catalyst system consists in the fact that it is possible with its aid to effect the copolymerization within a wide temperature range whereby products are obtained having especially favorable properties. Thus it is possible, for example, to produce copolymers of ethylene which are distinguished by an especially high crystallinity and hardness at a temperature of −20° C., however, the temperature range of 0° to +40° C. is preferred because the operation can be carried out most easily within this range. The high polymerization rates that can be attained in this range of temperature bring about a considerable economic advantage.

The reactants may be reacted directly or reacted in an organic solvent medium which does not contain active hydrogen as determined according to the method of Zerewitinoff. The solvent medium must also be chemically inert with respect to the aluminum-trialkyl at the polymerization temperatures. Saturated aliphatic, aromatic or hydroaromatic hydrocarbons are typical of solvents that may be used. The esters of aliphatic carboxylic acids with aliphatic alcohols, such as methyl acetate, ethyl acetate, propyl acetate, isopropyl acetate, butyl acetate, ethyl propionate, isopropyl propionate have been found to be the most suitable. Polymerizations which are to be effected under pressure can, for example, be carried out as follows:

Into a vessel that can resist the respective pressure, which vessel is either equipped with an agitator or which can be shaken during the reaction and is provided with a heating or cooling jacket, there is introduced the diluent (if a diluent is used) and the monomer which is to be copolymerized with the olefin, and the peroxide. The solution is blanketed with nitrogen, the aluminum compound is added with the exclusion of air and moisture and the olefin is forced in under pressure.

The following examples serve to illustrate the invention but they are not intended to limit it thereto. In the examples there is used the above-described experimental arrangement.

*Example 1*

An autoclave was charged with 80 grams of vinyl acetate, 48 mg. of diacetyl peroxide and 0.8 g. of aluminum triethyl at 0° C. and a constant ethylene pressure of 30 atmospheres gage established. The internal temperature rose temporarily to 20° C. After three hours, the surplus ethylene was blown off, the autoclave opened, the resinous copolymer that had formed dissolved in ethyl acetate, 1 cc. of acetic acid was added and the vinyl acetate that had not polymerized distilled off with steam. The product that remained behind was dried at 40° C. under 3 mm. Hg pressure. 52 grams of a copolymer were obtained for which an ethylene content of 12% was computed according to the C—H analysis.

*Example 2*

In the same apparatus as described in Example 1, the test was carried out as follows: The autoclave was charged with 56 g. of vinyl acetate, 24 g. of ethyl acetate, 100 mg. of diacetyl peroxide and 0.85 g. of aluminum triethyl, and a propylene pressure of 13 atmospheres gage was established at 20° C.

When the batch had been worked up after 8 hours in a manner analogous to Example 1, 15 g. of a copolymer were obtained which had a propylene content of 9.5% according to the C—H analysis and the determination of the acetyl groups, and which had a K value (according to Fikentscher, 1% strength in ethyl acetate) of 33.9.

*Example 3*

In this test there were used 56 g. of vinyl acetate, 24 g. of butyl acetate, 67 mg. of diacetyl peroxide and 0.9 g. of aluminum triisobutyl. An ethylene pressure of 50 atmospheres gage was established while the internal temperature was 6° C. When the batch had been worked up after 12 hours, 34 g. of a copolymer were obtained which contained 18.6% of ethylene and which had a K value (1% strength in ethyl acetate) of 45.3.

*Example 4*

There were used 56 g. of butyl acrylate, 24 g. of ethyl acetate, 67 mg. of dibenzoyl peroxide and 1 g. of aluminum triethyl. At a temperature of 25° C., the batch was shaken for six hours under a propylene pressure of 14 atmospheres gage. 19 grams of a copolymer were obtained that had a propylene content of 4.5% and a K value of 72.

*Example 5*

The autoclave was charged with 50 g. of ethyl acetate, 1 g. of vinyl acetate, 100 mg. of diacetyl peroxide and 0.9 g. of aluminum triethyl. The polymerization was carried out under an ethylene pressure of 42 atmospheres gage at a temperature of 18° C. After six hours the batch was worked up as described in Example 1. 7 grams of a copolymer were obtained having an ethylene content of 93.5%. The copolymer melted at 117° to 119° C. and was insoluble in methanol and ethyl acetate, but soluble in aromatic hydrocarbons.

*Example 6*

The autoclave was charged with 70 g. of methyl methacrylate, 120 mg. of dilauryl peroxide and 0.6 g. of aluminum triethyl while an ethylene pressure of 25 atmospheres gage was established. The surplus ethylene was blown off after two hours at 12° C., the polymer was taken up with methyl ethyl ketone, 1 cc. of acetic acid was added and the volatile constituents were distilled off with steam. After drying, 25 g. of a copolymer remained behind containing 8% of ethylene and having a K value of 98.

*Example 7*

The copolymerization of vinyl acetate and iso-butylene was carried out under normal pressure. A four-necked flask which was placed in a cooling bath and was equipped with stirrer, thermometer and gas inlet tube, was charged with 100 g. of vinyl acetate and 60 mg. of di-isopropyl percarbonate. The batch was cooled to −5° C. and 20 g. of iso-butylene were introduced into it. After blanketing with nitrogen, 0.8 g. of aluminum triethyl was added. The temperature was first maintained at 0° to −5° C. for five hours, then it was raised to 15° C. within another five hours.

The copolymer solution was acidified with acetic acid and freed from unreacted monomer by steam distillation. 28 grams of a copolymer were obtained that had a K value of 53 and an isobutylene content of 17.5%.

*Example 8*

A shaking autoclave that had been cooled to 5° C. was charged, under nitrogen, with a solution of 30 mg. of di-isopropyl percarbonate in 70 g. of vinyl propionate, as well as 0.5 g. of aluminum dibutyl hydride. Then the nitrogen was replaced by ethylene and a constant ethylene pressure of 25 atmospheres gage was established. The internal temperature rose temporarily to 15° C. After 4 hours the ethylene was blown off and the product freed from unreacted monomer at 70° C. under 3 mm. Hg pressure. 60 grams of a resinous copolymer were obtained that had an ethylene content of 8%.

We claim:

1. In the process for the manufacture of a copolymer of an olefin containing 2 to 4 carbon atoms with another copolymerizable monomer selected from the group consisting of vinyl esters, acrylic and methacrylic esters, vinyl chloride, maleic anhydride, vinyl carbazole, at a pressure of less than 70 atmospheres gage and at temperatures within the range of −80° C. to +60° C., the step which comprises using as a catalyst a mixture consisting essentially of an alumino-organic compound of the general formula

wherein $x$ and $y$ represent members of the group consisting of hydrogen, alkyl radicals of 1 to 8 carbon atoms, aryl radicals and cycloalkyl radicals; and $z$ represents a member of the group consisting of alkyl radicals of 1 to 8 carbon atoms, aryl radicals and cycloalkyl radicals, with an organic peroxide, the proportion by weight of aluminum compound to organic peroxide being from 100:1 to 100:50.

2. A process as claimed in claim 1 wherein the temperature used is within the range of −20° C. to +30° C.

3. A process as claimed in claim 1 wherein ethylene and vinyl propionate are polymerized.

4. A process as defined in claim 1 wherein the olefin is ethylene.

5. A process as defined in claim 1 wherein the olefin is propylene.

6. In a process for manufacture of a copolymer of an olefin containing 2 to 4 carbon atoms and of a monomer selected from the group consisting of vinyl esters, acrylic and methacrylic esters, vinyl chloride, maleic anhydride, and vinyl carbazole, at a pressure of less than 70 atmospheres gage and at temperatures within the range of −80° C. to +60° C., the step which comprises using as a catalyst a mixture consisting essentially of an alumino-organic compound of the general formula

wherein $x$ and $y$ represent members of the group consisting of hydrogen, alkyl radicals of 1 to 8 carbon atoms, aryl radicals and cycloalkyl radicals; and $z$ represents a member of the group consisting of alkyl radicals of 1 to 8 carbon atoms, aryl radicals and cycloalkyl radicals, with an organic peroxide, the proportion by weight of aluminum compound to organic peroxide being from 100:1 to 100:50, to form copolymers comprising 4% to 95% of monomeric units of said olefin.

References Cited in the file of this patent

UNITED STATES PATENTS

| | | |
|---|---|---|
| 2,842,474 | Pratt | July 8, 1958 |
| 2,868,771 | Ray | Jan. 13, 1959 |
| 3,024,225 | Teot | Mar. 6, 1962 |